The present invention relates to the production of ultrafine powders of the metals of group VIB and the ferrous metals of group VIII of the periodic table, the ultra-fine powders being formed of substantially uniform sub-micron particles. More particularly, the present invention relates to a process for producing powders of the aforesaid metals formed of substantially uniform particles having a diameter of less than about 0.1 micron.

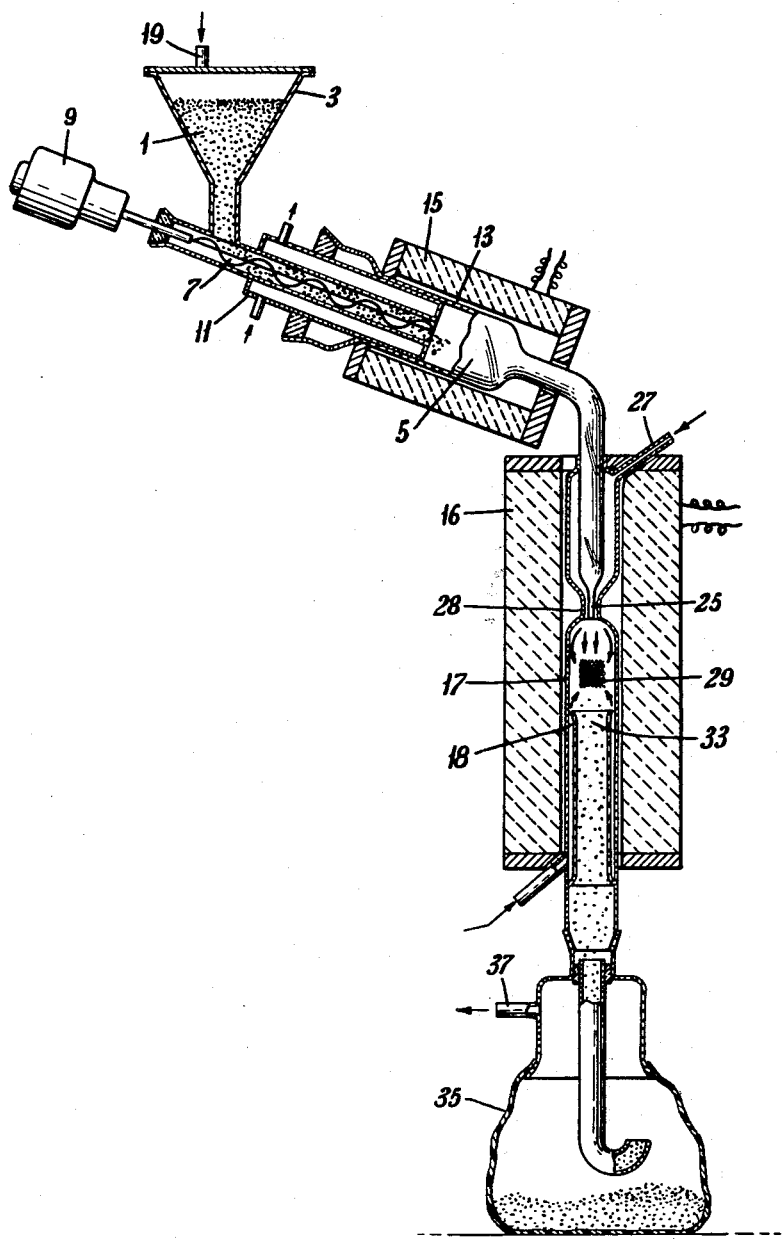
INVENTORS
JAMES B. CULBERTSON
HEADLEE LAMPREY
ROBERT L. RIPLEY
BY Donald C. Simpson
ATTORNEY 3,062,638
ULTRAFINE METAL POWDERS
James B. Culbertson, Lockport, Headlee Lamprey, Lewiston, and Robert L. Ripley, Lockport, N.Y., assignors to Union Carbide Corporation, a corporation of New York
Filed May 3, 1961, Ser. No. 107,388
5 Claims. (Cl. 75—.5)

It is an object of the present invention to provide a process for producing uniform ultrafine powders of the metals selected from group VIB and the ferrous metals of group VIII of the periodic table, the particles of the powders derived from the process being less than about 1 micron in diameter.

It is another object to provide a process for the production of ultrafine powders of the aforesaid metals, the powders being formed of substantially uniform particles having a grain size of less than 0.1 micron.

These and other objects will be apparent from the following description and claims taken in conjunction with the drawing in which:

The FIGURE shows, partly in section, an elevational view of an apparatus suitable for the production of substantially uniform sub-micron powders.

A process in accordance with the present invention for the production of metal particles having a grain size of less than about 1 micron comprises introducing a halide vapor of the selected metal, hydrogen and water vapor into a reaction zone located within a reactor and spaced away from all surfaces thereof; forming sub-micron particles of a suboxide of the selected metal away from all surfaces of the reactor by spontaneously reacting the halide vapor with the hydrogen and water vapor only within the reaction zone; rapidly removing the thus formed sub-micron sub-oxide particles from contact with the reacting materials; subjecting the thus formed sub-micron sub-oxide particles to a temperature at which the product sub-oxide is a solid stable material and which will limit particle grain growth to a predetermined sub-micron size; and subsequently reducing the sub-oxide particles to sub-micron metal particles by treating the sub-oxide particles with hydrogen at an elevated temperature at which the sub-oxide particles are solid and stable and which will limit the product metal particles to a predetermined sub-micron size.

While the present invention relates generally to ultrafine powders formed of substantially uniform metal particles less than about 1 micron in diameter, it is particularly directed to the production of metal powders formed of substantially uniform metal particles having a grain size of less than 0.1 micron.

By practicing the above-described embodiment of the present invention, a high degree of control of the particle size of the final metal product can be achieved. This is accomplished by first producing extremely fine, uniform sub-micron, sub-oxide particles and then reducing the sub-oxide particles with hydrogen. The reduction of the sub-micron lower oxide particles can be performed at relatively low temperatures and accordingly the production of a uniform and extremely fine metal powder can be readily achieved. Alternatively, the temperature of the reducing operation can be increased to promote grain growth of the particles and the production of powders formed of larger, substantially uniform, sub-micron particles.

The process of the present invention produces uniform finely-divided metal powders by first forming a uniform, sub-micron powder of a sub-oxide of the selected metal by the spontaneous reaction of an appropriate metal halide at an elevated temperature in the gas phase with hydrogen and water vapor, making certain that the reaction takes place in free space away from all surounding substrate; forming the sub-micron, sub-oxide particles directly at the reaction temperature; and rapidly cooling the thus formed sub-micron, sub-oxide particles to prevent enlargement of the particles to above the desired sub-micron size. After the sub-oxide powder is collected it is treated with hydrogen at an elevated temperature to reduce the sub-oxide particles to metal. The reducing operation is conducted at a temperature at which the sub-micron, sub-oxide powder is a stable solid material and which will limit the grain growth of the sub-oxide particles and metal product particles to a predetermined sub-micron size.

The importance of carrying out the sub-oxide particle-forming reaction in the gas phase may be better understood from the following discussion. Assume an element of volume $dx, dy, dz$, containing the chemicals which react to form a solid particle of the sub-oxide being produced. As these chemicals react, the weight and size of the particle formed will be determined by the amount of matter contained in the element $dx, dy, dz$, and by the rate of ingress of fresh reactants therein through diffusion or other means. Since matter is least dense in the vapor state, the particles produced will be smallest if the reactants are gaseous, provided that the particles initially formed are not allowed to grow in size through exposure to fresh reactants at the reaction temperature. Within the volume element $dx, dy, dz$, depletion of the reactants around the growing solid nucleus leads to the termination of the reaction thereby resulting in the formation of a small particle. This particle is, however, extremely prone to act as a precipitation or condensation nucleus for the build-up of a larger particle.

Accordingly, to prevent the formation of particles greater than sub-micron size the sub-micron particles which are formed in the reaction zone are rapidly removed from contact with the reacting halide vapor, hydrogen and water vapor; additionally, the turbulence, velocity and directions of the gases in the reactor are controlled so that the sub-micron particles, as they are formed, can freely exit the reaction zone and are not dispersed in the reactor. Maintaining the turbulence in the reactor at a minimum is an important feature of the present invention in order to ensure that the sub-micron particles are not retained in a high temperature region for any extended period of time since it is essential that the sub-micron particles formed in the reaction zone be rapidly exposed to a temperature which will limit the grain growth of the particles to a predetermined sub-micron size.

For example, in order to produce a uniform sub-oxide powder of less than 0.1 micron particle size, the sub-micron sub-oxide particles which are formed in the reaction zone are subjected to a quenching temperature below approximately one half the melting point, sublimation temperature or decomposition temperature, of the particular sub-oxide, whichever is lower. Temperatures greater than this quenching temperature provide increasingly larger particles and at temperatures higher than about 100° C. above this quenching temperature, some of the particles will be greater than sub-micron size and the powder produced will be generally lacking in uniformity. Lower temperatures will provide for the production of uniform sub-oxide powders of increasingly smaller diameters. It can be generally stated that quenching temperatures between about 400° C. and 1000° C. will ensure the production of uniform, sub-micron lower oxide powders, the lower temperatures being used at least with the materials having lower transition temperatures (i.e. melting point, sublimation temperature, decomposition temperature).

In the subsequent reduction of the sub-oxide particles to the metallic state with hydrogen gas, in order to prevent further grain growth, the temperature is maintained below the quenching temperature employed in the particular process operation, and below about one half the melting point of the metal being produced if the particle size of the final metal powder is to be below about 0.1 micron. Temperatures about 100° C. above one half the melting point promote the formation of particles greater than sub-micron size and the powders produced will be generally lacking in uniformity. Lower temperatures can be used to provide metal powders of increasingly smaller diameters, however it is obvious that the size of the starting sub-oxide particles will limit the minimum metal particle size that can be obtained. If it is desired to produce a metal powder having a larger sub-micron particle size than that of the starting sub-oxide powder, temperatures higher than the quenching temperature of the particular process are employed in the reducing operation. However the sub-oxide powder must not be reduced at a temperature above about 100° C. greater than one half its transition temperature in order to avoid the formation of a non-uniform powder containing particles above 1 micron in size.

The transition temperatures of several sub-oxide materials are set forth by way of example in Table I.

TABLE I

| Sub-Oxide | Transition Temp. | Sub-Oxide | Transition Temp. |
|---|---|---|---|
| $MoO_2$ | 1,927° C., d | NiO | 2,090° C., M.P. |
| $WO_2$ | 1,277° C., M.P | CaO | 1,800° C., d. |
| FeO | 1,420° C., M.P | | |

In certain embodiments of the present invention, the reactant materials are separately heated to the vapor state or to the temperature at which they will react, whichever is higher. Usually, for convenience the reactants are heated to the same temperature, which is referred to herein as the preheat temperature, although there are cases where, owing to thermal instability, the temperatures may necessarily be different. This preheating may be done in any convenient way, as for example by conduction, convection, or radiation.

The preheat temperature is not necessarily the same as the reaction temperature, which is the temperature in the reaction zone wherein the metal particle-forming reaction is taking place, generally it is lower.

The pre-heated gases, with or without inert diluents, are brought together in a reaction zone within a reaction chamber where the halide vapor, hydrogen and water vapor react spontaneously to form sub-micron sub-oxide particles. It is essential that the reaction zone be located spaced away from all the surfaces of the reactor in order to prevent the formation of film deposits and particles of greater than sub-micron size. It is also important to maintain the reaction zone in a confined and relatively small space within the reactor so that the gases in the reactor can be maintained substantially free from turbulence thereby preventing dispersion of the product sub-micron, sub-oxide particles within the reactor.

When pre-heated reactant gases are separately conducted to the reactor through inlet tubes or nozzles, it is necessary to provide some means to prevent a sub-oxide producing reaction at the tips of the tubes or nozzles since unless this is done, sub-oxide formations will build up and disrupt the in-flow of reactants.

One method for preventing the formation of metal deposits on the inlet tubes or nozzles and for maintaining the reaction zone in free space is to sheath one or more of the incoming reactant gas streams with a co-current non-reactive gas. This technique prevents mixing of the gases until they are at a predetermined distance from the inlet tubes or nozzles.

As has been stated above, it is an essential part of the present invention that the reactor be arranged to permit the sub-micron sub-oxide particle-forming reaction to take place in free space, i.e., remote from all reactor walls and substrate. If the reacting vapors are allowed to impinge on the reactor surfaces while the product powders are being formed, relatively large "plated" deposits will be produced which are more or less continuous rather than powdery. The plated particles are considerably greater than 1 micron in size and unless their formation is prevented, these larger particles will contaminate the product. Further, continued formation of large particles will greatly reduce process efficiency and possibly result in clogging of the reactor. Spherically or cylindrically shaped reaction vessels serve well to isolate the reaction from the walls when proper arrangement and control of the gaseous materials is provided. The reaction vessels may be made of glass, metal or other suitable material, although depending on the reaction being carried out and the desired purity of the powder being produced, special materials such as fused quartz may be preferred. The sub-oxide powder-forming reaction of the present invention is usually carried out at atmospheric pressure and on a continuous basis.

Since it is necessary in the present invention to provide a substantially turbulence-free environment surrounding the reaction zone, the shape and geometry of the reactor and gas inlet means are important design considerations. Expanding nozzles and tips of controlled geometrical shapes have been used with advantage to provide substantially stream-line flow of reactants into the reaction zone.

In order to prevent the growth of the sub-micron particles when once formed in the reaction zone, these particles must be cooled to a temperature at which continued undesired grain growth will not occur. One manner of achieving this result is to quench the reactant gases and entrained metal particles by passing these materials into a large volume of cold argon or other inert gas or liquid. Another technique is to cool the gases and metal particles by sudden expansion of the gases. A further method is to maintain the reaction zone length as short as possible and rapidly withdrawing the sub-micron product from the reaction zone.

The products of this invention are such extremely finely divided materials that their recovery and collection can be a difficult problem. Occasionally, when working with metallic products of high density, simple gravity collection works well in spite of the size of the particles. However, electrostatic precipitation is oftentimes the most effective method of powder collection.

In order to more clearly illustrate the practice of the present invention a detailed description of a preferred embodiment thereof for the production of sub-micron tungsten is presented hereinbelow with reference to the drawing.

A preferred process for the production of uniform sub-micron tungsten powders comprises injecting a stream of tungsten hexachloride vapor into a reaction zone located within a reactor and spaced away from all surfaces thereof; sheathing the halide vapor with a co-current stream of non-reactive gas; forming sub-micron particles of tungsten sub-oxide out of contact with all surfaces of the reactor by spontaneously reacting the halide vapor with hydrogen and water vapor only in the reaction zone; rapidly removing the thus formed sub-micron sub-oxide particles from contact with reacting materials; and subjecting the product sub-micron sub-oxide particles to a temperature which will limit particle grain growth to a predetermined sub-micron size.

In the above-described process a stream of metal halide vapor, sheathed with a co-current stream of non-reactive gas, is injected into a portion of a reactor which is spaced away from all surfaces of the reactor and which is designated herein as the reaction zone. The halide vapor is contacted by and reacts with a hydrogen and water vapor only in the reaction zone and, by supplying sufficient energy to the reactant materials to provide a spontaneous, sustained sub-oxide producing reaction, a substantially uniform sub-micron sub-oxide powder is formed in space, i.e. in the reaction zone remote from the surfaces and structure of the reactor, and the formation of large particles and film is avoided. The sub-micron sub-oxide particles formed in the reaction zone are rapidly removed therefrom by the gaseous stream of unreacted gas and by-product materials, to a portion of the reactor maintained at a temperature which limits grain growth of the sub-micron particles to the predetermined desired sub-micron size. The sub-micron particles are ultimately collected in a suitable receptacle and subsequently reduced by hydrogen gas at an elevated temperature which limits the final metal particles to a predetermined sub-micron size, the temperature of the reducing operation being below about one half the accepted melting point of the metal to ensure the formation of powders having an average particle size less than 0.1 micron. The reduction of the sub-micron sub-oxide particles is practiced with advantage by fluidizing the sub-oxide powder in a pre-heated stream of hydrogen.

In the production of sub-micron tungsten sub-oxide powder in the manner described above, a reactor is provided and pre-heated hydrogen gas and water vapor are introduced into the reactor. A pre-heated stream of tungsten hexachloride vapor, and a co-current sheathing stream of non-reactive gas, such as argon, are injected downward through concentric nozzles into a portion of the reactor spaced away from all surfaces of the reactor, i.e. the reaction zone. The pre-heated reactants, at a temperature between about 450° C. and about 1300° C., provide a spontaneous, and continuous sub-oxide powder-producing reaction within the reaction zone.

The argon gas shields the halide vapor stream from the surfaces of the reactor and forestalls reaction of the halide until the contact thereof with hydrogen and water vapor in the reaction zone. Additionally, the non-reactive gas is effective in preventing the reacting materials and product particles from contacting the reactor surfaces, and also in rapidly removing the sub-micron particles from the reaction zone to a cooler zone in which undesired grain growth is prevented.

The tungsten sub-oxide powder-producing reaction is at all times spaced away from the surfaces of the reactor and spaced away from and below the concentric sheath gas and vapor nozzles. The position of the reaction zone, can be and is maintained confined in a restricted space remote from the nozzles, by adjustment of the velocities of the sheathing gas and halide vapor; increasing the velocities tends to increase the separation of the reaction zone from the nozzles. During the practice of the present invention, the flow of gaseous materials in the reactor is controlled so as to maintain the space adjacently surrounding the reaction zone in a substantially turbulence-free condition.

The above-described embodiment of the process of the present invention is efficiently conducted in the apparatus illustrated in the FIGURE of the drawing.

With reference to the figure, a solid metallic halide 1, for example tungsten hexachloride, is provided in hopper 3 which is enclosed to exclude air. The solid metal halide 1 is fed into halide vaporizing zone 5 by a screw-feed mechanism 7 driven by a motor 9 which is adapted to be operated at different speeds of rotation so as to control the rate at which the halide is fed into the vaporizing zone. The screw-feed mechanism 7 is surrounded by water jacket 11 to prevent premature vaporization of the halide. Halide vaporizer 13, which encloses vaporizing zone 5, is heated by means of vaporizing furnace 15 to maintain the temperature in the vaporizing zone sufficiently high to cause the halide to be rapidly transferred into the vapor state. Hydrogen reducing gas and water vapor pre-heated to between 450° C. and 1300° C. by reaction furnace 16 is introduced into the reaction chamber of reactor 17 through annular vent 18 and provides a hydrogen-water vapor atmosphere in the reactor. The halide vapor produced in the vaporizing zone is pre-heated to between 450° C. and 1300° C. by reaction furnace 16 and passes into the tubular reaction chamber of reactor 17 with an inert gas such as argon. The argon is introduced through carrier gas inlet 19 to eliminate the possibility of diffusion of metal halide vapors into the halide feed mechanism. The metal halide vapor is injected downwardly into reactor 17 by means of halide vapor nozzle 25 which is centrally aligned with the reaction chamber; and a sheathing or shielding non-reactive gas, such as argon, introduced through inlet 27, is injected co-current with the halide vapor stream into reactor 17 through annular shield gas nozzle 28. Nozzle 28, surrounding nozzle 25 communicates with the reaction chamber and is arranged to be concentric with and to terminate in approximately the same horizontal plane as halide vapor nozzle 25. The co-current stream of shield gas, injected through annular nozzle 28, provides what may be described as an envelope or sheath for the halide vapor and the halide vapor is caused to thereby contact and react with the hydrogen and water vapor only in reaction zone 29 which is spaced away from the surfaces of the reactor and below the nozzles. The contact between the pre-heated halide vapor and pre-heated hydrogen and water vapor promotes a spontaneous and continuous sub-micron sub-oxide particle-forming reaction which is evidenced by a "flame" in the reaction zone spaced away from the surfaces of the reactor and below the nozzles. The co-current streams of shield gas and halide vapor are adjusted so that between the nozzles 25 and 28, and the reaction zone 29, the halide vapor is shielded from the surfaces of the reactor whereby the sub-micron particle-forming reaction is forestalled until the halide vapor is contacted by the $H_2$ and $H_2O$ vapor in the reaction zone 29.

In order to avoid the possibility of solid sub-oxide formation, the reaction chamber of reactor 17, as illustrated in the drawing, is arranged having the upper and inner surfaces thereof curved outward from the reaction zone, and having a diameter at least about three times that of the shield gas nozzle whereby the surfaces and structure of the reactor are located remote from the reaction zone.

Further, as shown in the figure, the upwardly flowing hydrogen and water vapor mixture, upon contacting the downwardly flowing stream of shield gas, is directed toward the reaction zone thereby further ensuring a sub-micron sub-oxide particle-forming reaction located out of contact with the structure and surfaces of the reactor.

The sub-micron tungsten sub-oxide particles formed in the reaction zone are rapidly directed to a cooler zone, in which further grain growth is prevented, by the combined gas currents of argon, unreacted gas, by-product gas, and by gravity. This cooler zone in the illustrated apparatus is the portion of the reactor directly below the reaction zone. In the illustrated apparatus the temperature in the cooler zone is about the same as the pre-heat temperature of the reactants. However by modifying the apparatus the temperature in this cooler zone can be independently varied to control the final particle size. The product sub-micron particles ultimately exit the reactor through outlet 33 located below the reaction zone and interior annular reducing gas vent 18. A suitable collector, such as polyethylene bag 35 is provided to collect the ultrafine sub-oxide particles, and an outlet 37 is further provided for the exit of waste gases from the reactor. The sub-oxide particles are subsequently reduced by pre-heated hydrogen gas. For example, this can be accomplished by continuously passing the sub-micron sub-oxide powder counter-current to a stream of purified hydrogen in a rotating quartz tube.

In place of argon, other suitable gases which may be employed in the above-described process include the inert gases designated in the periodic table.

The following Examples I and II are presented to illustrate the previously described process:

*Example I*

Employing an apparatus similar to that shown in the drawing, 1 mole per hour of $WCl_6$ vapor, pre-heated to 800° C. is introduced into the reactor through the halide vapor nozzle. Argon gas at the rate of 1 mole per hour is passed through the sheath gas nozzle into the reactor. Water vapor and hydrogen, at rates of 2 moles per hour and 1 mole per hour respectively, pre-heated to 800° C., are also introduced into the reactor. The halide vapor, hydrogen and water vapor are reacted only in the reaction zone, spaced away from all reactor surfaces; sub-micron particles of tungsten sub-oxide (2 gram atomic weights of oxygen per one gram atomic weight of tungsten) are formed in the reaction zone and rapidly removed therefrom by the flow of sheath gas and by-product vapor and the particles are collected electrostatically. The sub-oxide particles are reduced to tungsten metal by continuously passing the particles through a rotating quartz tube at a rate of 1 mole per hour counter-current to a stream of purified hydrogen at a rate of 10 moles per hour and a temperature of 800° C. A substantially uniform tungsten powder formed of particles having a diameter of about 0.08 micron is recovered.

*Example II*

Employing an apparatus similar to that shown in the drawing, 2 moles per hour of $FeCl_3$ vapor, pre-heated to 800° C. is introduced into the reactor through the halide vapor nozzle. Argon gas at the rate of 2 moles per hour is passed through the sheath gas nozzle into the reactor. Water vapor and hydrogen, at rates of 2 moles per hour and 1 mole per hour respectively, preheated to 800° C., are also introduced into the reactor. The halide vapor, hydrogen and water vapor are reacted only in the reaction zone, spaced away from all reactor surfaces; sub-micron particles of FeO are formed in the reaction zone and rapidly removed therefrom by the flow of sheath gas and by-product vapor and the particles are collected electrostatically. The sub-oxide particles are reduced to iron metal by continuously passing the particles through a rotating quartz furnace at a rate of 2 moles per hour counter-current to a stream of purified hydrogen at a rate of 10 moles per hour and a temperature of 400° C. A substantially uniform iron powder formed of particles having a diameter of about 0.08 micron is recovered.

In the production of tungsten sub-oxide and other sub-oxides in the process of the present invention energy is supplied to the reactants to provide a sub-oxide producing reaction at a reaction temperature above that at which the reactants are volatile and below that at which melting, sublimation or decomposition of the thus formed ultra-fine particles occurs. Preferably, the reaction temperature is maintained below the sintering temperature of the sub-micron particles formed in the reaction zone. This condition can be readily achieved in reactions in which only sub-oxide material is being produced.

In another embodiment of the present invention, uniform, sub-micron powders of the high melting metals, tungsten and molybdenum, are produced directly by the reaction of metal oxide vapor, e.g. $MoO_3$, $WO_3$, with hydrogen, and water vapor.

A process in accordance with this embodiment of the present invention comprises introducing hydrogen, water vapor and an oxide vapor of a metal selected from the group consisting of molybdenum and tungsten into a reaction zone located within a reactor and spaced away from all surfaces thereof, forming sub-micron particles of the selected metal away from all surfaces of the reactor by spontaneously reacting the oxide vapor with the hydrogen and water vapor only within the reaction zone; rapidly removing the thus formed sub-micron particles from contact with the reaction materials; and subjecting the thus formed sub-micron particles to a temperature which will limit particle grain growth to a pre-determined sub-micron size. This process is conveniently practiced in the apparatus illustrated in the drawing. In order to provide a particle-forming reaction in free space, away from all surfaces and substrate, and to provide a rapid removal of the sub-micron particles from the reaction zone, the previously described techniques are employed.

The following Examples III and IV are presented to illustrate the process for directly producing uniform, sub-micron metal powders from metal oxide vapor.

*Example III*

HCl, at a rate of 1 mole per hour is passed through a bed of $MoO_3$ at 500° C. to provide a vaporized HCl complex $MoO_3 \cdot HCl$. Employing an apparatus similar to that shown in the drawing, the $MoO_3 \cdot HCl$ vapor is passed into the reactor through the inner nozzle. Argon gas at the rate of 1 mole per hour is passed through the sheath gas nozzle into the reactor. Hydrogen, at the rate of 15 moles per hour pre-heated to 500° C., is introduced into the reactor. The $MoO_3 \cdot HCl$ vapor and hydrogen are reacted only in the reaction zone, spaced away from all reactor surfaces; sub-micron particles of molybdenum are formed in the reaction zone and rapidly removed therefrom by the flow of sheath gas and by product vapor and the particles are collected electrostatically. A substantially uniform molybdenum powder formed of particles having a diameter of about 0.07 is recovered.

*Example IV*

$MoO_3$ is heated in a vaporizer at 1050° C. to provide $MoO_3$ vapor at 12 grams per minute. The vapor is passed through a high density graphite tube at 1100° C. and through a nozzle into a reactor at 9040 milliliters per minute. Argon, preheated to 1100° C., is introduced into the reactor through a quartz tube concentrically surrounding the $MoO_3$ vapor nozzle to provide a sheath gas at a rate of 1.5 liters per minute. Hydrogen gas, at a rate of 1.5 grams per minute and a temperature of 1100° C. is introduced into the reactor through a quartz tube concentrically surrounding the argon carrying tube. The $MoO_3$ vapor and hydrogen are reacted only in a reaction zone located in the reactor and spaced away from all surfaces thereof. Sub-micron particles of molybdenum are formed in the reaction zone and rapidly removed therefrom by the flow of sheath gas and by-product vapor to a zone maintained at a temperature of 800° C. The particles are collected at a rate of 8 grams per minute and provide a substantially uniform sub-micron powder having an average particle size of 0.05 micron.

In the production of uniform sub-micron molybdenum and tungsten powders from oxide vapor, to prevent the formation of particles greater than sub-micron size the sub-micron particles which are formed in the reaction zone are rapidly removed from contact with reacting oxide vapor, hydrogen and water vapor; additionally, the turbulence, velocity and directions of the gases in the reactor are controlled so that the sub-micron particles, as they are formed, can freely exit the reaction zone and are not dispersed in the reactor. Maintaining the turbulence in the reactor at a minimum is an important feature of the present invention in order to insure that the sub-micron particles are not retained in a high temperature region for any extended period of time since it is essential that the sub-micron particles formed in the reaction zone be rapidly exposed to a temperature which will limit particle grain growth to the desired sub-micron size. For example, in order to produce a uniform powder of less than 0.1 micron particle size, the sub-micron particles which are formed in the reaction zone are subjected to a temperature below approximately one half the accepted melting point of the particular metal. Temperatures greater than about one half the melting point for a particular metal provide increasingly larger particles, and at temperatures higher than about 100° C. above one half the melting point, some of the particles will be greater than sub-micron size and the powders produced will be generally lacking in uniformity. Temperatures lower than about one half the melting point will provide for the production of uniform powders of increasingly smaller diameters. It can be stated generally that subjecting the particles formed in the reaction zone to temperatures between about 350° and 1000° C. will ensure the production of uniform sub-micron molybdenum and tungsten powders.

In the process of the present invention the size of the particles produced in the reaction zone can be controlled by varying the temperature to which the initially formed sub-micron particles are rapidly removed i.e., the quenching temperature; the lower quenching temperatures providing smaller particles. The powders produced by the present invention are formed of particles having substantially the same size and shape, i.e., substantially more than a major proportion of the particles correspond to the average particle size. This characteristic property of the powders of the present invention is of utility in the powder metallurgical art for providing sintered and coalesced metal materials having substantially lower than theoretical density.

In addition to tungsten, molybdenum and iron, uniform sub-micron powders of tantulum, vanadium, columbium, chromium, cobalt and nickel can also be produced by the process of the present invention.

The periodic table referred to in the above description is that which appears in Fundamental Chemistry, 2nd edition, by H. G. Deming, J. Wiley & Sons.

What is claimed is:

1. A process for the production of uniform submicron powders of a metal selected from group VIB and the ferrous metals of group VIII, said process comprising introducing hydrogen, water vapor and a halide vapor of the selected metal into a reaction zone located within a reactor and spaced away from all surfaces thereof; spontaneously reacting said halide vapor with the hydrogen and water vapor only in said reaction zone to form sub-micron particles of a sub-oxide of the selected metal out of contact with all surfaces of the reactor; rapidly removing the thus formed sub-micron sub-oxide particles from contact with the reacting materials; subjecting the produced sub-micron particles to a temperature which limits particle grain growth to a predetermined sub-micron size; and subsequently collecting the sub-oxide particles and reducing the sub-oxide particles with hydrogen gas at a temperature which limits the grain growth of the sub-oxide particles and metal product particles to a predetermined sub-micron size.

2. A process in accordance with claim 1 for producing a uniform, sub-micron tungsten powder wherein said halide vapor is tungsten hexachloride.

3. A process in accordance with claim 1 for producing a uniform, sub-micron iron powder wherein said halide vapor is $FeCl_3$.

4. A process for the production of uniform sub-micron powders of a metal selected from the group consisting of tungsten and molybdenum, said process comprising introducing hydrogen, water vapor and an oxide vapor of the selected metal into a reaction zone located within a reactor and spaced away from all surfaces thereof; spontaneously reacting said oxide vapor, hydrogen and water vapor only in said reaction zone to form sub-micron particles of the selected metal out of contact with all surfaces of the reactor; rapidly removing the thus formed sub-micron particles from contact with the reacting materials; and subjecting the produced sub-micron particles to a temperature which limits particle grain growth to a predetermined sub-micron size.

5. A process in accordance with claim 4 for the production of uniform sub-micron molybdenum powder wherein said oxide vapor is $MoO_3$.

No references cited.

UNITED STATES PATENT OFFICE
CERTIFICATE OF CORRECTION

Patent No. 3,062,638                      November 6, 1962

James B. Culbertson et al.

It is hereby certified that error appears in the above numbered patent requiring correction and that the said Letters Patent should read as corrected below.

Column 3, TABLE I, third column, line 2 thereof, for "CaO" read -- CrO --.

Signed and sealed this 18th day of June 1963.

(SEAL)
Attest:

ERNEST W. SWIDER
Attesting Officer

DAVID L. LADD
Commissioner of Patents